United States Patent Office
3,531,377
Patented Sept. 29, 1970

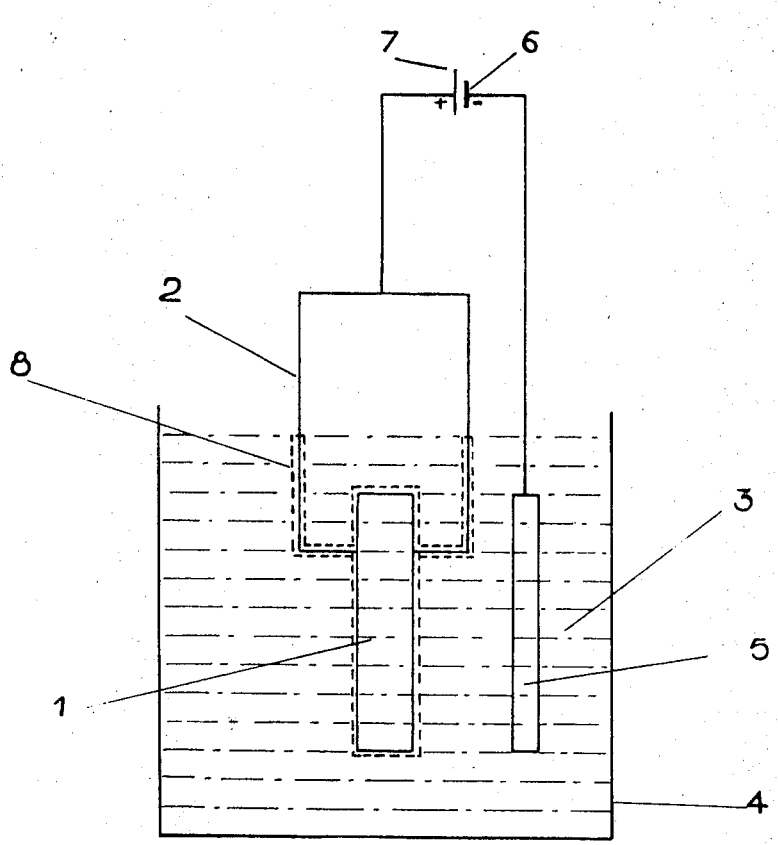

3,531,377
PROCESS FOR THE OXIDATION OF GALLIUM-ARSENIDE
Michel Croset, Paris, France, assignor to CSF-Compagnie Generale de Telegraphie Sans Fil, a corporation of France
Filed May 31, 1967, Ser. No. 642,485
Claims priority, application France, June 3, 1966, 64,147
Int. Cl. C23b 5/00
U.S. Cl. 204—14    2 Claims

ABSTRACT OF THE DISCLOSURE

A process of oxidizing the surfaces of a gallium-arsenide component, giving rise to the formation of a gallium-arsenide oxide film which can be employed in the manufacture of semiconductor devices. The component to be treated is immersed in a bath of electrolyte in which oxidized gallium-arsenide is insoluble, said electrolyte bath containing a conductive salt dissolved in a non-aqueous solvent, said solvent being saturated with arsenic anhydride.

---

The present invention relates to a novel process of oxidizing the surfaces of a gallium-arsenide component, giving rise to the formation of gallium-arsenide oxide films which can be employed in the manufacture of semiconductor devices.

It is well known that films of this kind have a very wide field of application.

For example, they can be employed to passivate, i.e. protect, the surfaces of finished components or can act as masks during the diffusion of impurities into a semiconductor body, thus precisely defining the zone wherein the diffusion takes place.

There are two known methods of producing a coating of this kind.

The first method is a heat treatment consisting of high temperature oxidation of the surface considered.

Generally speaking, the results obtained are good but this kind of operation involves the risk of producing undesired modifications in the component being treated, in particular in the event that, in the course of its manufacture, it has been subjected to other heat treatments.

The second method is an electrolytic treatment at ambient temperature.

The component is immersed in an aqueous electrolyte, where it serves as the anode. The oxygen required for oxidation is derived from the water. However, since this oxygen quantity is not dosed, it is always in excess and the deposit becomes porous so that it cannot properly fulfill the masking function.

According to the invention, there is provided a process for oxidizing the surface of a gallium-arsenide body, comprising the steps of immersing said body in an electrolytic bath, said bath comprising a non-aqueous solvent, saturated with arsenic oxide, and a salt, and of causing a current to flow across said bath, with said body as an anode.

For a better understanding of the invention and to show how the same may be carried into effect, reference will be made to the drawing accompanying the following description and the only figure of which shows one embodiment of the invention:

In this figure, a plate of gallium-arsenide 1 is held in place by means of a jaw arrangement 2 in an electrolyte 3 contained in a bath 4. The assembly of gallium-arsenide plate 1 and jaw arrangement 2 constitutes the anode, and a cathode 5 is provided, connected to the negative terminal 6 of a direct current supply, the anode 1–2 being connected to the positive terminal 7 of the supply.

In accordance with the invention, the metal of which the jaw arrangement 2 is made, is selected so that, like the gallium-arsenide 1, it becomes covered with a layer 8 of oxide in the electrolyte 3. The electrolyte 3 is in accordance with the invention formed by a nonaqueous oxidising solvent, saturated with arsenic oxide, and by a salt which renders the solution conductive. The oxide layer 8 deposited on the surface of the jaw arrangement thus insulates the latter from the bath 8 and oxidation can therefore progress normally without any necessity for previous insulation of the said jaws.

In an example which by no means constitutes a limitation, the nonaqueous solvent, serving as electrolysis, is acetic acid, while sodium or potassium acetate is used as added salt.

Once the bath is ready for use, a strip of a metal, which is also oxidable in said solution is used to form a jaw. Tantalum has all the requisite properties in this respect and is also easily worked to form a jaw arrangement. The pressure contact area between Ga, As and Ta, which requires no insulation, can therefore be reduced to an area of negligible size, i.e. as little as a few tenths of a square millimetre only.

The gallium-arsenide jaw arrangement is then immersed in the electrolyte solution hereinbefore defined and connected to the positive terminal of a direct current supply. The cathode, connected to the negative terminal, may be made of platinum, for example.

Oxidation is carried out with a constant current below or equal to $200\ \mu\text{A./cm.}^2$ of oxidable area, until a desired voltage, corresponding to the requisite oxide thickness, is reached.

After withdrawal of the plate of gallium-arsenide, it is found to be oxidized over the whole of its surface with the exception of the points where it has been in contact with the jaw, i.e. a negligible area. The oxide obtained has all the qualities requisite for use either as a diffusion mask or as a passivating element on finished surfaces.

Of course, the invention is not limited to the embodiment described and shown which was given solely by way of example.

What is claimed is:

1. A process for oxidizing the surface of a gallium-arsenide body, comprising the steps of immersing said body in an electrolytic bath, said bath consisting essentially of a non-aqueous oxidising solvent, saturated with arsenic oxide, and a salt, and of causing a current to flow across said bath, with said body as an anode.

2. A process according to claim 1, wherein said solvent is acetic acid and said salt is an acetate of sodium and/or potassium.

References Cited
UNITED STATES PATENTS
3,312,603   4/1967   Wales _____ 204—14

ROBERT K. MIHALEK, Primary Examiner
T. TUFARIELLO, Assistant Examiner

U.S. Cl. X.R.
204—130